Sept. 20, 1949.　　　　F. H. DERRY ET AL　　　　2,482,328
SAFETY DEVICE FOR HYDRAULIC BRAKE SYSTEMS
Filed June 23, 1947　　　　　　　　　　　2 Sheets-Sheet 1
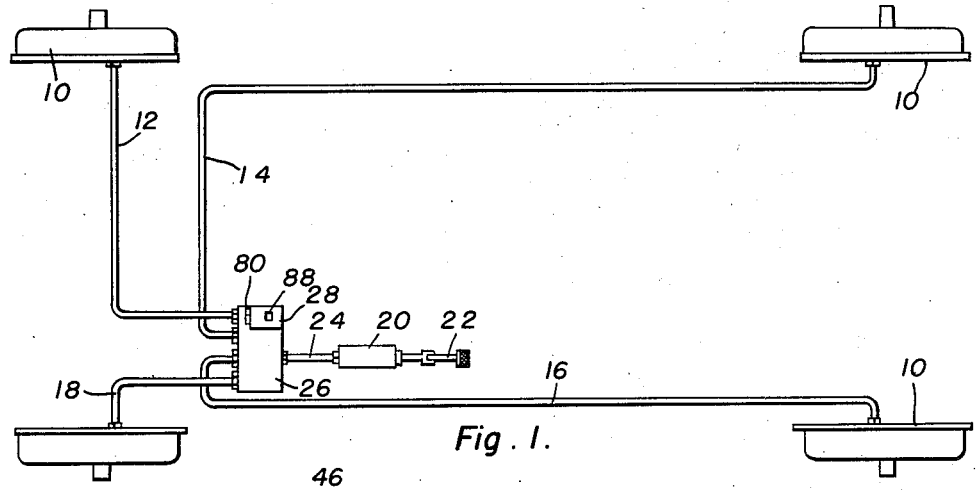
Floyd H. Derry
Leo Hammett Sept. 20, 1949.　　　F. H. DERRY ET AL　　　2,482,328
SAFETY DEVICE FOR HYDRAULIC BRAKE SYSTEMS
Filed June 23, 1947　　　2 Sheets-Sheet 2

Inventors
Floyd H. Derry
Leo Hammett

By *Clarence A. O'Brien and Harvey B. Jacobson*
Attorneys

Patented Sept. 20, 1949

2,482,328

UNITED STATES PATENT OFFICE 2,482,328

SAFETY DEVICE FOR HYDRAULIC BRAKE SYSTEMS

Floyd H. Derry and Leo Hammett, Readsville, Mo.

Application June 23, 1947, Serial No. 756,478

3 Claims. (Cl. 303—84)

This invention relates generally to hydraulic brake systems and more particularly to a safety device whereby failure of one individual line in such a system will cause the isolation of that particular line, with other remaining lines not incapacitated.

A primary object of this invention is to provide a device applicable to the hydraulic braking systems of automotive vehicles, with a view to avoiding the danger due to the complete loss of braking power attendant on breakage of one of the individual lines leading to the four wheels of the vehicle.

Another object of this invention is to provide a safety device of this character which is applicable to many different types of automotive vehicles and applicable thereto without special adaptation.

Still another object is to provide a device of this character which is characterized by extreme sensitivity and quick action when a break occurs in one of the individual lines of a hydraulic brake system, preventing loss of fluid and preventing lapse of breaking power on the wheels of the vehicle unaffected by said break.

A still further object is to provide a safety mechanism in which the parts adapted for movement at the time of an emergency will not become lodged and inoperative during the normal use of the vehicle.

And a last object to be specifically mentioned is to provide a means of this character which is relatively inexpensive and practicable to manufacture, extremely simple and convenient to install, maintain and use, and which will give generally efficient and durable service.

With these objects definitely in view, this invention resides in certain novel features of construction, combination and arrangement of parts and portions which will be hereinafter described and particularly pointed out in the appended claims, one embodiment of the instant invention being illustrated in the accompanying drawings which form a material part of this application, and in which:

Figure 1 is a schematic view of this invention operatively connected with the braking mechanisms of the wheels of an automobile and the master cylinder and foot pedal actuating means ordinarily provided;

Figure 2 is a top plan view of the casing used to house the elements of this invention, the inlet and outlet lines, and certain of the internal elements in dash lines;

Figure 3 is an end elevational view of the device as viewed from the left hand side of Figure 2;

Figure 4 is a side elevational view of the device;

Similar characters of reference designate similar or identical parts and portions throughout the specification and throughout the several views of the drawings.

Figure 5:
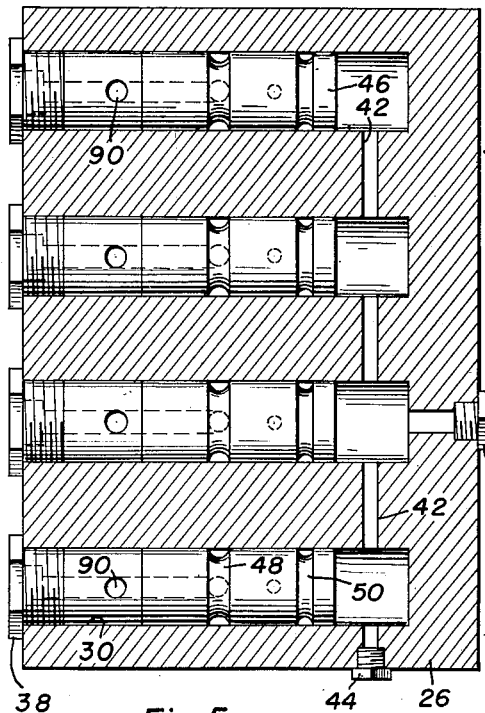
Figure 5 is a horizontal sectional view, taken on the line 5—5 in Figure 4.

Referring now to these drawings, in detail, the environment wherewith this invention is adapted to be used includes the four wheels 10 of a motor vehicle, tubular individual lines 12, 14, 16 and 18, a master cylinder 20 which is operatively connected to the pedal lever 22 and the tubular line 24. It will be understood that the wheels 10 are equipped with brake mechanisms adapted to be actuated by pressurized hydraulic fluid in the lines 12—18.

The instant invention includes a casing 26 which may be generally rectangular in shape with an upstanding portion 28 at one end thereof.

The casing 26 has four similar cylinders 30 which will ordinarily be disposed in parallel relation and extend inwardly into the casing from one side thereof. The outer ends of each of these cylinders 30 is separately connected to the lines 12—18 by means of short interconnecting channels 32, having what will herein be considered vertical channel portions 34. It will be understood that suitable gland nuts 36 will be used to connect the various lines to the casing 26, and the plugs 38 are used to close the ends of the cylinders 30.

The inner ends 40 of the cylinders 30 are interconnected by a cross channel 42, the outer end of which is closed by a sealing plug 44. Each of the cylinders 30 is provided with a plunger 46 which fits closely within the carefully machined cylinder and is annularly grooved as at 48 and at 50. A locking ball 52 is biased into plunger-locking position in the groove 50 by a spring 54, the ball and spring being housed within a drilled aperture 56 which is tapped to receive a spring-retaining screwed plug 58.

The other groove 48 provides for communication of the channel portions 34 with the vertical channel portions 60 of second cross channels 62 in the casing, the outer end of this second cross channel being closed by a plug 64. A helical spring 66 is compressed between the outer end of each plunger 46 and the plug 38 to bias the plunger as to the right in Figure 7.

A pressure valve, generally indicated by the numeral 68, having a head 70 and stem 72 both of which parts are axially channeled, is reciprocatively mounted within the upstanding portions 28 of the casing which is provided with a stepped bore having a valve seat 74. This valve has a perforated guide sleeve 76 associated with the reduced stem portion 72 thereof and is biased, as to the right in Figure 6, by a spring 78 compressed between the head 70 of the valve and a plug 80 used to close the end of the enlarged portion of the said bore. The inner end of the axially channeled stem portion 70 of the valve is closed by a needle valve 82 biased into closed position by a small spring 84. A short channel leads from this valve assembly to a vertical channel 86 which communicates with inner end 40 of one of the cylinders 30, the outer end of this last mentioned channel being closed by the plug 88. It should be carefully noted that each of the cylinders 30 communicate with the channel 32, through short vertical channels 90, opening into said cylinders adjacent the inner ends of the plugs 38.

The operation of this invention will be understood from a consideration of the foregoing description of the mechanical details thereof taken in connection with the above recited objects sought to be achieved by this invention, but it may be expedient to add that the plungers 46 are self-positioning under the influence of the spring 66 and the pressures of the hydraulic fluid at either end of the plunger.

The pressure in the ends 40 of the cylinders is controlled by the pedal lever 22, while the pressure in the ends of the cylinder varies in accord with the tensioning of the brake shoe retracting springs, not shown, in the wheels 10, when no leak or break exists in the individual lines 12—18. When pressure is applied by the pedal lever, a pressure build-up results in the portion of the system directly connected to the ends 40 of the cylinders due to the action of the pressure valve 68 and the spring 66.

As brakes are applied fluid pressure is increased exerting pressure on the right side of all plungers and on the right side of the pressure valve 68. As pressure is increased, the pressure valve 68 will move to the left and allow fluid to pass to the left side of the valve 68 and through to the plunger, around the grooves 48 and into drilled passages 32 and to the wheel cylinder. Since there is a resisting force caused by the brake shoe springs there will be built up a back pressure on the left side of the four plungers. Further pressure on the plungers is caused by a spring 66. Thus, we have equal fluid pressure on both sides of the plungers and a spring on the left side to keep the plungers biased to the right. When pressure is released the brake shoe springs will force the fluid back through the needle valve 82 hereinafter described.

When brakes are not in proper working order, as pressure is applied by the brake pedal, pressure is exerted on the right side of all the plungers. On the left sides there are counteracting pressures of the spring 66 and fluid pressure resulting from the action of the brake springs keeping the plungers in place. If a line should break, there will be a loss of pressure on the left side of the plunger concerned and only the spring 66 will have pressure on the left side. This spring 66 is not a very strong spring and unequal pressure on the plunger will move the plunger to the left cutting off the flow of liquid. Should we eliminate the pressure valve, there would be nothing to build up pressure on the right sides of the plungers because the fluid would have a direct flow to the break in the line. This should explain why the pressure build up is necessary in order that the mechanism will function properly when a fault occurs in a line, due to vibration or other causes, while the brake pedal is not being depressed, as well as when a fault occurs while pressure is being applied.

Figure 6:
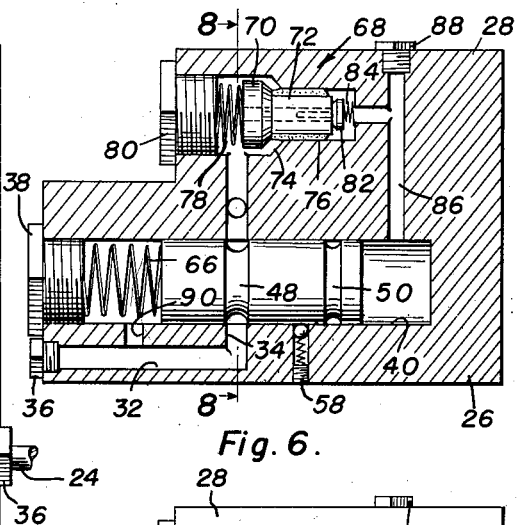
Figure 6 is a vertical sectional view, taken on the line 6—6 of Figure 3.
Figure 7:
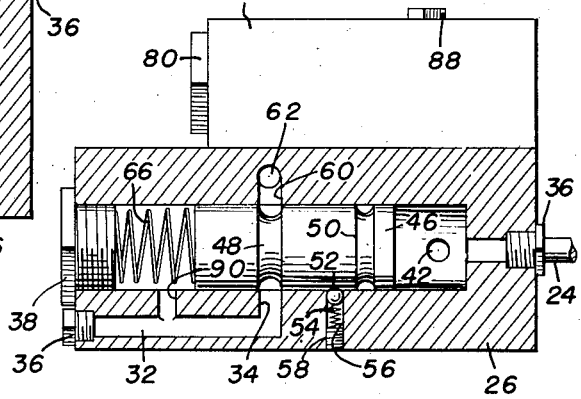
Figure 7 is a vertical sectional view as taken from the line 7—7 in Figure 3.

The area of the ends of the plungers 46 and valve 68, and the compressibility of the springs 66 and 78 must be carefully related to allow the opening of the valve 68 before the plungers 46 are forced as to the left into the positions illustrated in Figures 6 and 7. In normal operations, with the plungers in these positions, the pressure in each of the individual lines 12—18 will be substantially equal to the pressure in p. s. i. in the ends 40 of the cylinders.

Figure 8:
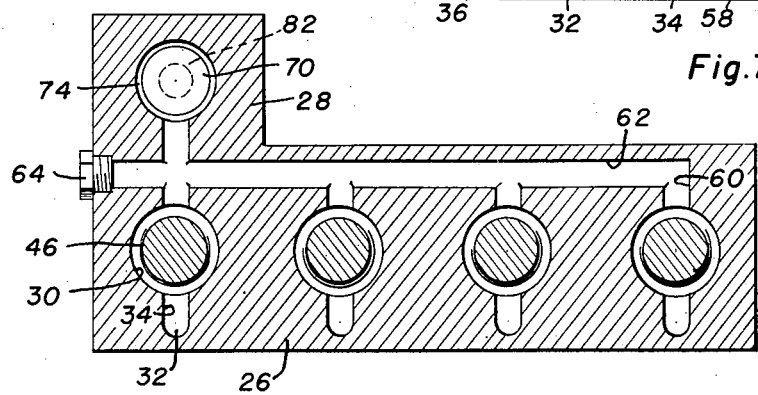
Figure 8 is a vertical sectional view, taken on the line 8—8 in Figure 6.

However, if a break or fast leak exists in one of these individual lines, the pressure will be greatly reduced therein and the corresponding plunger will be immediately forced, as to the left in Figures 7 and 8, closing the channels 34 and 60 and preventing loss of fluid through the fault in this line. It will also be noted that when the plunger has been moved as described in the preceeding sentence, the ball 52 will be forced into the groove 50, thereby locking the plunger in position closing off the line concerned until such time as repair of the line can be effected. It should be noted that the valve 88 allows fluid to return to the master cylinder when the brake shoes are contracted by the brake shoe springs when the brakes are released after an application thereof.

Though a single preferred embodiment of this invention has been described and illustrated, it will be obvious that many minor variations in the details of construction may be made, all within the scope and spirit of this invention. Accordingly, limitation is sought only in accordance with the obvious meaning of the terms used to describe the construction, combination and arrangement of parts and portions in the claims hereto appended.

What is claimed as new and novel and desired to be protected by Letters Patent is:

1. A safety device for isolating faulted lines in a hydraulic pressure system, comprising a casing having a plurality of cylinders with hydraulically sealed solid valve plungers of lengths less than said cylinders therein, one end of each cylinder communicating with a common port, the outer ends of the cylinders communicating with individual lines in said system and with a common channel connected to said port, said plungers having circumferential grooves and controlling passages from said channel to said individual lines, and locking means to retain each of said plungers in a position closing the corresponding channel when unequalized pressure on the two ends of said plunger has caused the shifting of said plunger into said position, said plunger being biased to move away from said position to prevent shifting of the plungers due to jarring of the device.

2. A safety device for isolating faulted lines in a hydraulic pressure system, comprising a casing having a plurality of cylinders with hydraulically sealed valve plungers of lengths less than said cylinders therein, one end of each cylinder communicating with a common port, the outer ends of the cylinders communicating with individual lines in said system and with a common channel connected to said port, said plungers controlling passages from said channel to said individual lines, and locking means to retain each of said plungers in a position closing the corresponding channel when unequalized pressure on the two ends of said plunger has caused the shifting of said plunger into said position, said plunger being biased to move away from said position, and a pressure valve operatively connected in said common channel to counteract the effect of said biasing and to build up pressure on said one end of each plunger.

3. A safety device for isolating faulted lines in a hydraulic pressure system, comprising a casing having a plurality of cylinders with hydraulically sealed valve plungers of lengths less than said cylinders therein, one end of each cylinder communicating with a common port, the outer ends of the cylinders communicating with individual lines in said system and with a common channel connected to said port, said plungers controlling passages from said channel to said individual lines, and locking means to retain each of said plungers in a position closing the corresponding channel when unequalized pressure on the two ends of said plunger has caused the shifting of said plunger into said position, said plunger being biased to move away from said position, and a pressure valve operatively connected in said common channel to counteract the effect of said biasing and to build up pressure on said one end of each plunger, said pressure valve having a bleed valve allowing flow toward said common port.

FLOYD H. DERRY.
LEO HAMMETT.

REFERENCES CITED

The following references are of record in the file of this patent:

UNITED STATES PATENTS

| Number | Name | Date |
| --- | --- | --- |
| 2,093,015 | Madden | Sept. 14, 1937 |
| 2,095,560 | Vickers | Oct. 12, 1937 |
| 2,110,342 | Salvo | Mar. 8, 1938 |
| 2,190,872 | George et al. | Feb. 20, 1940 |
| 2,198,522 | Adam | Apr. 23, 1940 |